(12) United States Patent
Singh et al.

(10) Patent No.: US 9,896,523 B2
(45) Date of Patent: Feb. 20, 2018

(54) ZIEGLER-NATTA CATALYST SYNTHESIS AND PROCESS THEREOF

(71) Applicant: Indian Oil Corporation Limited, Bandra (East), Mumbai (IN)

(72) Inventors: Gurmeet Singh, Faridabad (IN); Naresh Kumar, Faridabad (IN); Sukhdeep Kaur, Faridabad (IN); Bhasker Bantu, Faridabad (IN); Gurpreet Singh Kapur, Faridabad (IN); Shashikant, Faridabad (IN)

(73) Assignee: INDIAN OIL CORPORATION LIMITED, Bandra (Ease) (IN)

( * ) Notice: Subject to any disclaimer, the term of this patent is extended or adjusted under 35 U.S.C. 154(b) by 0 days.

(21) Appl. No.: 15/185,019

(22) Filed: Jun. 17, 2016

(65) Prior Publication Data

US 2016/0376384 A1    Dec. 29, 2016

(30) Foreign Application Priority Data

Jun. 26, 2015 (IN) .......................... 2457/MUM/2015

(51) Int. Cl.
    *C08F 110/02* (2006.01)
(52) U.S. Cl.
    CPC .................. *C08F 110/02* (2013.01)

(58) Field of Classification Search
    None
    See application file for complete search history.

(56) References Cited

U.S. PATENT DOCUMENTS

| 4,260,709 A | 4/1981 | Durand et al. |
| 4,379,898 A | 4/1983 | Selman et al. |
| 4,535,068 A | 8/1985 | Job |
| 7,220,694 B2 | 5/2007 | Tanase et al. |
| 2013/0338321 A1* | 12/2013 | Coalter, III ............. C08F 10/00 526/125.7 |

FOREIGN PATENT DOCUMENTS

JP        H0277406       3/1990

* cited by examiner

*Primary Examiner* — Catherine S Branch
(74) *Attorney, Agent, or Firm* — Workman Nydegger (57) ABSTRACT

The present invention describes a process of preparing a catalyst for olefin polymerization comprising: (i) treating a magnesium metal with an organohalide along with an internal donor to obtain a reaction mixture having solid component (A); (ii) treating the reaction mixture having solid component (A) with an acyl halide to obtain a reaction mixture having solid component (B); and (iii) treating the reaction mixture having solid component (B) of step (ii) with a transition metal compound to obtain the catalyst. The present invention also relates to a process for preparation of a catalyst system from said catalyst and preparation of a polyolefins from the catalyst system.

29 Claims, 1 Drawing Sheet

ZIEGLER-NATTA CATALYST SYNTHESIS AND PROCESS THEREOF

FIELD OF THE INVENTION

The present invention describes a process of preparing a catalyst for olefin polymerization. The catalyst is prepared by treating magnesium metal with organohalide along with internal donor to obtain a solid component. Further, this solid component is treated with acyl halide and thereafter with transition metal compound to provide catalyst which along with cocatalyst is able to polymerize ethylene with good activity and desirable polymer properties.

BACKGROUND OF THE INVENTION

Ziegler-Natta catalyst systems are well known for their capability to polymerize olefins. They generally consist of a support which mostly is magnesium based onto which titanium component has been added along with organic compound known as internal donor. This catalyst when combined with co-catalyst and/or external donor comprise of the complete ZN catalyst system. Ziegler-Natta catalyst system which typically consists of transition metal halide normally titanium halide supported on metal compound which is typically magnesium dichloride. Along with transition metal, also there is organic component known as internal electron donor that plays a typical role during catalyst synthesis and polymerization. $MgCl_2$ carrier, where the $MgCl_2$ is in active form, can be created by various methodologies. One of the methods is precipitating the $MgCl_2$ from an organic solution where magnesium is present as a soluble compound. The soluble magnesium compound can be achieved by starting from a magnesium alkyl and treating it with an alcohol. This step is then followed by chlorination of Mg alkyl or alkoxy compounds by a chlorination agent. The magnesium carrier can also be precipitated in the form of 'ready-made' $MgCl_2$. In that case the $MgCl_2$ has to be dissolved first in some suitable donor compound and then precipitated in hydrocarbon solvent. The $MgCl_2$ support material can also be precipitated by chlorinating a soluble magnesium alkyl compound simply by treating it with chlorine gas or hydrochloric acid. Once the desired specification of carrier is obtained, this is generally followed by titanation procedure which finally results in the catalyst synthesis.

JPH0277406 describes catalyst capable of giving highly stereo-regular polymers having ordered shape, comprising a specific solid component containing Mg, Ti, alkyl monohalide, phthalic acid derivative and aliphatic alcohol, etc., Si compound and organoaluminum compound. The component A is prepared by the following process: a mixture comprising (1) a substrate formed by reaction, in the presence of iodine, between metallic Mg powder and two or more molar times of an alkyl monohalide and (2) a phthalic diester is grounded, and the resulting product is incorporated, in the presence of an aliphatic hydrocarbon, at ≥70° C., with a tetraalkoxytitanium, aliphatic alcohol and phthalic dichloride successively in this order to make respective treatments, and the resultant product is then incorporated with titanium tetrachloride to make a treatment. The component (B) is a Si component of the formula (R is alkyl, vinyl or aryl; R' is alkyl; 0<=m<4), and component (C) an organoaluminum compound. The catalyst describe herein comprises of component A, B and C.

U.S. Pat. No. 7,220,694 relates to a magnesium compound effective in producing olefin polymers having an increased bulk density and a narrowed particle size distribution, without compromising on the stereospecificity of the polymers produced and the polymerization activity. The olefin polymerization catalyst comprises (A) a solid catalyst component prepared by contacting a magnesium compound having a specific particle size distribution index (P), a titanium compound and an electron donor compound with each other, (B) an organometallic compound, which is organoaluminum compound and (C) an electron donor which belongs to electron donors which are added to improve the stereospecificity of the olefin polymer during polymerization i.e. external electron donor.

U.S. Pat. No. 4,260,709 describes catalysts for use in the polymerization of olefins comprising compounds of magnesium and one or more transition metals of groups IVa, Va and VIa, which are at least partially reduced, with the catalysts being prepared by reaction of magnesium, at least one mono-halogenated hydrocarbon and a compound of a transition metal having a valence of at least 4. The catalysts can be used for the polymerization of olefins, such as ethylene, in the low-pressure process.

U.S. Pat. No. 4,379,898 describes polymerization catalyst preparation comprising of milling magnesium metal, an organic halide and titanium tetrahalide in the presence of a triaryl phosphite and an aluminum trihalide but in the absence of a complexing diluent. The titanium catalyst component is activated with an organoaluminum activator producing a catalyst for olefin polymerization.

The present art of Ziegler-Natta catalyst synthesis involves the usage of magnesium based compounds for the generation of active support. The magnesium based compounds are generally derived products of magnesium. The usage of metallic magnesium as such in the preparation of precursor is very limited.

SUMMARY OF THE INVENTION

The present invention is a description of catalyst synthesis which involves metallic magnesium usage without any alcohol or any other oxygen containing component. The magnesium is directly reacted with organohalide in presence of internal donor.

Accordingly, the present invention provides a process of preparing a catalyst for olefin polymerization comprising:
(i) treating a magnesium metal with an organohalide along with an internal donor to obtain a reaction mixture having solid component (A);
(ii) treating the reaction mixture having solid component (A) with an acyl halide to obtain a reaction mixture having solid component (B); and
(iii) treating the reaction mixture having solid component (B) of step (ii) with a transition metal compound to obtain the catalyst.

In an embodiment of the present invention, the organohalide is selected from a group comprising of alkyl halides, benzylic halides, halogenated alkyl benzene and mixture thereof; wherein:
(i) alkyl halide is selected from a group comprising of methyl chloride, ethyl chloride, propyl chloride, isopropyl chloride, 1,1-dichloropropane, 1,2-dichloropropane, 1,3-dichloropropane, 2,3-dichloropropane, butyl chloride, 1,4-dichlorobutane, tert-butylchloride, amylchloride, tert-amylchloride, 2-chloropentane, 3-chloropentane, 1,5-dichloropentane, 1-chloro-8-iodoctane, 1-chloro-6-cyanohexane, cyclopentylchloride, cyclohexylchloride, chlorinated dodecane, chlorinated tetradecane, chlorinated eicosane, chlorinated pentacosane, chlorinated triacontane, iso-octylchloride, 5-chloro-5-methyl decane, and 9-chloro-9-ethyl-6-methyl eiscosane;
(ii) benzylic halide is selected from a group comprising of benzyl chloride and α,α' dichloro xylene; and
(iii) halogenated alkyl benzene comprises alkyl radical containing from about 10 to 15 carbon atoms, and the halogen is selected from the group comprising of chlorine, bromine, fluorine and iodine.

In another embodiment of the present invention, the magnesium metal is reacted with the organohalide in a molar ratio of between 1:30 to 1:1.

In another embodiment of the present invention, the internal electron donor is selected from a group comprising of phthalates, benzoates, diethers, succinates, malonates, carbonates/carboxylate, silyl esters, amide esters, ether esters, amide ethers, silyl ethers, silyl ether esters, 1,2-phenylene dioates and combinations thereof; wherein:
(i) phthalates is selected from a group comprising of di-n-butyl phthalate, di-i-butyl phthalate, di-2-ethylhexyl phthalate, di-n-octyl phthalate, di-i octyl phthalate, di-n-nonyl phthalate;
(ii) benzoates is selected from a group comprising of methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate, methyl anisate, and ethyl anisate;
(iii) succinate is selected from a group comprising of diethyl succinate, di-propyl succinate, diisopropyl succinate, dibutyl succinate, and diisobutyl succinate;
(iv) malonates is selected from a group comprising of diethyl malonate, diethyl ethylmalonate, diethyl propyl malonate, diethyl isopropylmalonate, and diethyl butylmalonate;
(v) carbonates/carboxylate is selected from a group comprising of diethyl 1,2-cyclohexanedicarboxylate, di-2-ethylhexyl 1,2-cyclohexanedicarboxylate, di-2-isononyl 1,2-cyclohexanedicarboxylate, 1,2-phenylene diisopentanoate, 4-t-butyl-1,2-phenylene diisopentanoate, 4-t-butyl-1,2-phenylene bis(2-ethylhexanoate), and diisobutyl 2,2'-((4-tert-butyl)-1,2-pheylene)bis(oxy)diacetate; and
(vi) diether/ether is selected from a group comprising of 9,9-bis(methoxymethyl)fluorene, 2-isopropyl-2-isopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane, and tetrahydrofuran or mixture thereof.

In another embodiment of the present invention, the internal electron donor is used in an amount of from 0.01 to 1 moles with respect to one mole of magnesium.

In another embodiment of the present invention, the contact of magnesium metal, organohalide and internal donor is either neat or in a solvent.

In another embodiment of the present invention, the solvent is selected from a group comprising of chlorinated aromatic hydrocarbon, non chlorinated aromatic hydrocarbon, chlorinated aliphatic hydrocarbon, non chlorinated aliphatic hydrocarbon and combination thereof.

In another embodiment of the present invention, the solvent is comprising from 40 to 60 volume percent and is selected from a group comprising of benzene, decane, kerosene, ethyl benzene, chlorobenzene, dichlorobenzene, toluene, o-chlorotoluene, xylene, dichloromethane, chloroform, hexane, heptane, isooctane, cyclohexane and combination thereof.

In another embodiment of the present invention, the contact of magnesium, organohalide and internal donor either neat or in the solvent is at temperature between about 0° C. and about 150° C. and the contact time is for about 0.5 to 12 h.

In yet another embodiment of the present invention, the solid component (A) is separated from the reaction mixture either by filtration or decantation and finally washed with a solvent to remove unreacted components and other side products before reacting with the acyl halide.

In yet another embodiment of the present invention, the solid component (A) is washed one or more times with a solvent selected from a group comprising of pentanes, hexanes, heptanes, octanes, decanes, toluene, chlorobenzene at a temperature from about 20° C. to about 120° C.

In yet another embodiment of the present invention, the solid component (A) is used as such after washing or is isolated and treated further with solvent to form a reaction mixture before reacting with acyl halide.

In yet another embodiment of the present invention, the acyl halide is represented by RCOX where R is H, $C_1$-$C_{20}$ linear or branched alkyl group which optionally linked with cyclic rings, $C_6$-$C_{14}$ aryl groups, $C_3$-$C_{15}$ cycloalkyl groups, $C_1$-$C_{20}$ alkoxy group, optionally containing heteroatom and X is selected from halides.

In yet another embodiment of the present invention, the acyl halide is selected from a group comprising of formyl chloride, acetyl chloride, benzoyl chloride, tert-butylbenzoyl chloride, 2-ethyl hexanoyl chloride, valeryl chloride, isovaleryl chloride, phthaloyl chloride, 2,3-naphthalenedicarboxylic dichloride, endo-5-norborene-2,3-dicarboxylic acid dichloride, maleic dichloride, citraconic acid dichloride and combination thereof.

In an embodiment of the present invention, a molar ratio of magnesium to acyl halide is between 1:5 to 1:0.05.

In another embodiment of the present invention, the acyl halide contact with the solid component (A) results in formation of solid component (B) and the contacting time is immediate to 2 h, and a contact temperature is between about 5° C. and about 150° C.

In yet another embodiment of the present invention, the solid component (B) is separated from the reaction mixture either by filtration or decantation and finally washed with a solvent to remove unreacted components and other side products before reacting with the transition metal compound.

In yet another embodiment of the present invention, the solid component (B) is washed one or more times with the solvent selected from a group comprising of pentanes, hexanes, heptanes, octanes, decanes, toluene, and chlorobenzene at a temperature from about 20° C. to about 120° C.

In yet another embodiment of the present invention, the transition metal compound is transition metal halide selected from compounds represented by $M(OR')_pX_{4-p}$, where M is a transition metal and is selected from a group comprising of Ti, V, Zr, and Hf; X is a halogen atom; R' is a hydrocarbon group and p is an integer having value equal or less than 4.

In yet another embodiment of the present invention, the transition metal compound is selected from a group comprising of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof; wherein:
(a) the transition metal tetrahalide is selected from a group comprising of titanium tetrachloride, titanium tetrabromide, titanium tetraiodide, vanadium tetrachloride, vanadium tetrabromide, vanadium tetraiodide, zirconium tetrachloride, zirconium tetrabromide, zirconium tetraiodide, hafnium tetrachloride, hafnium tetrabromide, and hafnium tetraiodide;

(b) alkoxy transition metal trihalide/aryloxy transition metal trihalide is selected from a group comprising of methoxytitanium trichloride, ethoxytitanium trichloride, butoxytitanium trichloride, phenoxytitanium trichloride methoxyvanadium trichloride, ethoxyvanadium trichloride, butoxyvanadium trichloride, phenoxyvanadium trichloride, methoxyzirconium trichloride, ethoxyzirconium trichloride, butoxyzirconium trichloride, phenoxyzirconium trichloride, methoxyhafnium trichloride, ethoxyhafnium trichloride, butoxyhafnium trichloride, and phenoxyhafnium trichloride;

(c) dialkoxy transition metal dihalide is selected from a group comprising of diethoxy titanium dichloride diethoxy vanadium dichloride, diethoxy zirconium dichloride, and diethoxy hafnium dichloride;

(d) trialkoxy transition metal monohalide is selected from a group comprising of triethoxy titanium chloride, triethoxy vanadium chloride, triethoxy zirconium chloride, and triethoxy hafnium chloride; and (e) tetraalkoxy transition metal is selected from a group comprising of tetrabutoxy titanium, tetraethoxy titanium, tetrabutoxy vanadium, tetraethoxy vanadium, tetrabutoxy zirconium, tetraethoxy zirconium, tetrabutoxy hafnium, and tetraethoxy hafnium.

In yet another embodiment of the present invention, contact temperature of the transition metal compound with the solid component (B) is between about −50° C. and about 150° C. and heating is instigated at a rate of 0.1 to 10.0° C./minute.

In yet another embodiment of the present invention, the solid component (B) contacts with transition metal compound either neat or in a solvent. In one embodiment of the present invention, the solvent is selected from a group comprising of chlorinated aromatic hydrocarbon, non chlorinated aromatic hydrocarbon chlorinated aliphatic hydrocarbon, non chlorinated aliphatic hydrocarbon and combination thereof. In another embodiment of the present invention, the solvent is comprising from 40 to 60 volume percent and selected from a group comprising of benzene, decane, kerosene, ethyl benzene, chlorobenzene, dichlorobenzene, toluene, o-chlorotoluene, xylene, dichloromethane, chloroform, cyclohexane and combination thereof.

In one embodiment of the present invention, the process is a single pot catalyst synthesis.

In another embodiment of the present invention, the contact of the solid component (B) with transition metal compound is single.

The present invention provides a catalyst which is obtained from the process as discussed above comprising from about 2.0 wt % to 20 wt % of internal electron donor, transition metal from about 1.0 wt % to 10.0 wt % and magnesium from about 10 wt % to 25 wt %.

The present invention also provides a process for preparation of a catalyst system, said process comprising contacting the catalyst as obtained by the process as discussed above with at least one cocatalyst, and at least one external electron donor to obtain the catalyst system.

The present invention provides a process of polymerizing and/or copolymerizing olefins, the process comprising the steps of contacting an olefin under a polymerization conditions with the catalyst system.

DETAILED DESCRIPTION OF THE INVENTION

The present invention discloses a process of preparing a catalyst for olefin polymerization. This process is alcohol free route to prepare the catalyst. The catalyst is prepared by treating magnesium metal with organohalide along with internal donor to obtain a solid component (A). In accordance with the present invention, the solid component (A) obtained by this contact is treated with acyl halide and further with transition metal compound to provide catalyst which along with cocatalyst is able to polymerize olefins with good activity and desirable polymer properties.

In an embodiment, the magnesium used in the present invention includes, not limited to, for example magnesium metal in form of powder, granules, ribbon, turnings, wire, blocks, lumps, and chips.

In an embodiment, the organohalide which is contacted with magnesium compound, includes, not limited to, for example alkyl halides such as methyl chloride, ethyl chloride, propyl chloride, isopropyl chloride, 1,1-dichloropropane, 1,2-dichloropropane, 1,3-dichloropropane, 2,3-dichloropropane, butyl chloride, 1,4-dichlorobutane, tert-butylchloride, amylchloride, tert-amylchloride, 2-chloropentane, 3-chloropentane, 1,5-dichloropentane, 1-chloro-8-iodoctane, 1-chloro-6-cyanohexane, cyclopentylchloride, cyclohexylchloride, chlorinated dodecane, chlorinated tetradecane, chlorinated eicosane, chlorinated pentacosane, chlorinated triacontane, iso-octylchloride, 5-chloro-5-methyl decane, 9-chloro-9-ethyl-6-methyl eiscosane; benzylic halides, such as benzyl chloride and α,α' dichloro xylene; chlorinated alkyl benzene wherein the alkyl radical contains from about 10 to 15 carbon atoms, and the like as well as the corresponding bromine, fluorine and iodine substituted hydrocarbons. These organohalides may be used alone or in the form of mixture thereof. The organohalide is preferably butyl chloride and mixtures thereof.

The quantity of organohalide depends upon the quantity of magnesium used. According to the preferred embodiment, the magnesium is reacted with the said organohalide in a molar ratio of between 1:30 to 1:1. In one of the preferred embodiment the magnesium is reacted with the said organohalide in a molar ratio of between about 1:15 to 1:1.

In an embodiment, internal electron donor is selected from phthalates, benzoates, diethers, succinates, malonates, carbonates, silyl esters, amide esters, ether esters, amide ethers, silyl ethers, silyl ether esters, 1,2-phenylene dioates, cyclic ethers and combinations thereof. Specific examples include, but are not limited to di-n-butyl phthalate, di-i-butyl phthalate, di-2-ethylhexyl phthalate, di-n-octyl phthalate, di-i octyl phthalate, di-n-nonyl phthalate, methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate, diethyl succinate, di-propyl succinate, diisopropyl succinate, dibutyl succinate, diisobutyl succinate, diethyl malonate, diethyl ethylmalonate, diethyl propyl malonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2- cyclohexanedicarboxylate, methyl anisate, ethyl anisate and diether compounds such as 9,9-bis(methoxymethyl)fluorene, 2-isopropyl-2-isopentyl-1,3-dimethoxypropane, 2,2-diisobutyl-1,3 -dimethoxypropane, 2,2-diisopentyl-1,3 -dimethoxypropane, 2-isopropyl-2-cyclohexyl-1,3-dimethoxypropane, tetrahydrofuran, 1,2-phenylene diisopentanoate, 4-t-butyl-1,2-phenylene diisopentanoate, 4-t-butyl-1,2-phenylene bis(2-ethylhexanoate), Diisobutyl 2,2'-((4-tert-butyl)-1,2-pheylene)bis(oxy)diacetate preferably di-n-butyl phthalate, ethyl benzoate, tetrahydrofuran or mixtures thereof.

All internal electron donor compounds commonly used in the art can be used in the present invention. In another embodiment, the internal electron donor is used in an amount of from 0.01 to 1 mole with respect to one mole of magnesium. In one of the preferred embodiment the internal electron donor is used in an amount of from 0.01 to 0.5 moles, with respect to one mole of magnesium.

In an embodiment, the contact of magnesium, organohalide and internal donor can be either neat or in solvent which can be chlorinated or non chlorinated aromatic or aliphatic in nature examples not limiting to benzene, decane, kerosene, ethyl benzene, chlorobenzene, dichlorobenzene, toluene, o-chlorotoluene, xylene, dichloromethane, chloroform, hexane, heptane, isooctane, cyclohexane and the like, comprising from 40 to 60 volume percent. In another embodiment, the contact of magnesium, organohalide and internal donor either neat or in solvent is at temperature between about 0° C. and about 150° C. In one of the preferred embodiment the contact temperature is between about 10° C. and about 120° C. Usually, the contact time is for about 0.5 to 12 h. Preferably the contact time is not less than 2 h.

The resulting solid component (A) can be separated from the reaction mixture either by filtration or decantation and finally washed with solvent to remove unreacted components and other side products. Usually, the resultant solid material is washed one or more times with solvent including, not limiting to the like pentanes, hexanes, heptanes, octanes, decanes, toluene, chlorobenzene. In an embodiment, the resulting solid mixture is washed one or more times with solvent preferably, toluene and/or chlorobenzene at temperature from about 20° C. to about 120° C. Preferably the resulting solid mixture is washed one or more times with solvent at temperature from about 25° C. to about 100° C. The resultant solid component (A) then can be dried and further analyzed.

WAXD measurements were carried using a Panalytical, Empyrean X-ray diffractometer in a special cell under inert atmosphere. Crystallite Size calculations were performed using High Score Plus software.

Table 1 describes the solid components prepared for XRD studies

TABLE 1

| Cat. No | Mg | RX | Mg/RX | ID | Solvent/Acyl Halide | Ti wt % | Mg wt % |
|---|---|---|---|---|---|---|---|
| PEC#99 | Granules | BuCl | 1/7 | DIBP | nil | For XRD studies | |
| PEC#103 | Granules | BuCl | 1/7 | DIBP | benzoyl chloride | For XRD studies | |
| PEC#109 | Granules | BuCl | 1/7 | nil | nil | For XRD studies | |
| PEC#110 | Granules | BuCl | 1/7 | DIBP | Acetyl chloride | For XRD studies | |

PEC#109 was synthesized by the contact of Mg with Butyl chloride only i.e., no internal donor was added during catalyst synthesis and its XRD pattern (FIG. 1) corresponds to disordered $MgCl_2$ characterized by 3 broad peaks at $2\Theta$ 13-18, $2\Theta$ 27-38 and $2\Theta$ 49-54 . While, for PEC#99, PEC#110 and PEC#103 which were synthesized wherein internal donor, diiso-butyl phthalate, was added during the contact of Mg with butyl chloride, explicit impact on the crystallinity was observed. The diffraction peak at $2\Theta$ 13-18 in the later samples gets significantly lower in intensity with respect to PEC#109 . This region is attributed to the arrangement of Cl—Mg—Cl triple layers in the different $MgCl_2$ phases and the distinct feature of samples prepared with internal donors indicates uniqueness in structure of Cl—Mg—Cl triple layers. The uniqueness due to internal donor can be attributed to intercalation of internal donor added and corresponding Lewis bases which get generated in-situ which distorts the inter layer structure thereby lowering the intensity of corresponding peak.

Figure 1:
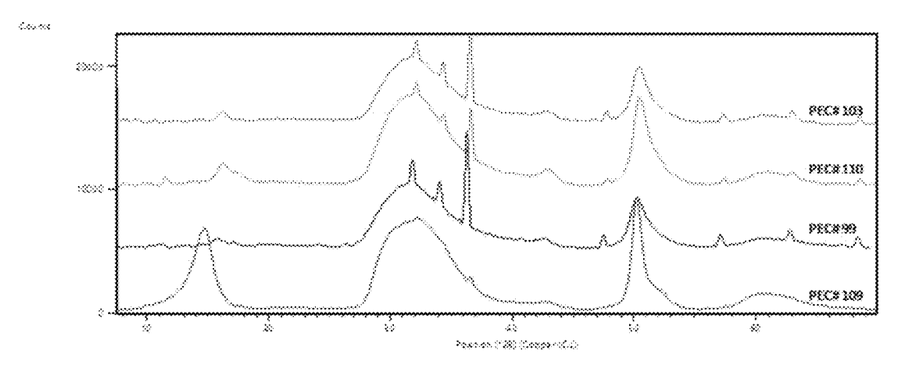
FIG. 1: illustrates WAXD of solid component obtained by reacting Mg with butyl halide in presence as well as absence of DIBP further treated with acyl halide.

Crystallite size calculations were performed on the peak in the region $2\Theta$ 50-51 post component analysis (Macromol. Chem. Phys. 2009, 210, 69-76) and crystallite size calculated for PEC#109, PEC#99, PEC#110 and PEC#103 is 114, 71, 73 and 71 respectively. This establishes the fact that internal donor addition during contact of magnesium with alkyl halide not only had significant effect on inter layer structure of $MgCl_2$ but is also able to reduce the crystallite size of product which is very important for high activity catalysts.

In an embodiment, the resultant solid component (A) is dried and then hydrocarbon preferably toluene is added to form a reaction mixture. Further in another embodiment, the reaction mixture is contacted with acyl halides represented by RCOX where R is H, $C_1$-$C_{20}$ linear or branched alkyl group which can be linked with cyclic rings, $C_6$-$C_{14}$ aryl groups, $C_3$-$C_{15}$ cycloalkyl groups, $C_1$-$C_{20}$ alkoxy group, may or may not containing heteroatom and X is selected from halides. The examples including but not limiting to formyl chloride, acetyl chloride, benzoyl chloride, tert-butylbenzoyl chloride, 2-ethyl hexanoyl chloride, valeryl chloride, isovaleryl chloride, phthaloyl chloride, 2,3-naphthalenedicarboxylic dichloride, endo-5-norborene-2,3-dicarboxylic acid dichloride, maleic dichloride, citraconic acid dichloride and the like. In another embodiment, the molar ratio of magnesium to acyl halides is between 1:5 to 1:0.05 . In another embodiment, mixtures of acyl halides may be used.

Further, in an embodiment, the time of contact with acyl halide can be from immediate to 2 h. In one of the preferred embodiment the time of contact with acyl halide is immediate to 1 h. In another embodiment, the contact temperature is between about 5° C. and about 150° C. Preferably the contact temperature is between about 10° C. and about 100° C. The resulting solid component (B) can be separated from the reaction mixture either by filtration or decantation and finally washed with solvent to remove unreacted components and other side products. Usually, the resultant solid material is washed one or more times with solvent including, not limiting to the like pentanes, hexanes, heptanes, octanes, decanes, toluene, chlorobenzene. In an embodiment, the resulting solid mixture is washed one or more times with solvent preferably, toluene and/or chlorobenzene at temperature from about 20° C. to about 120° C. Preferably the resulting solid mixture is washed one or more times with solvent at a temperature from about 25° C. to about 100° C. The resultant solid component (B) can be dried and further analyzed.

In an embodiment, solid component (B) is treated with transition metal halide selected from compounds represented by $M(OR')_pX_{4-p}$, where M is a transition metal and is selected from a group comprising of Ti, V, Zr, and Hf, preferably Ti; X is a halogen atom; R' is a hydrocarbon group and p is an integer having value equal or less than 4.

In yet another embodiment, the transition metal compound represented by $M(OR')_pX_{4-p}$ is selected from a group comprising of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof; wherein:

(a) the transition metal tetrahalide is selected from a group comprising of titanium tetrachloride, titanium tetrabromide, titanium tetraiodide, vanadium tetrachloride, vanadium tetrabromide, vanadium tetraiodide, zirconium tetrachloride, zirconium tetrabromide, zirconium tetraiodide, hafnium tetrachloride, hafnium tetrabromide, and hafnium tetraiodide;

(b) alkoxy transition metal trihalide/aryloxy transition metal trihalide is selected from a group comprising of methoxytitanium trichloride, ethoxytitanium trichloride, butoxytitanium trichloride and phenoxytitanium trichloride, methoxyvanadium trichloride, ethoxyvanadium trichloride, butoxyvanadium trichloride, phenoxyvanadium trichloride, methoxyzirconium trichloride, ethoxyzirconium trichloride, butoxyzirconium trichloride, phenoxyzirconium trichloride, methoxyhafnium trichloride, ethoxyhafnium trichloride, butoxyhafnium trichloride, and phenoxyhafnium trichloride;

(c) dialkoxy transition metal dihalide is selected from a group comprising of diethoxy titanium dichloride, diethoxy vanadium dichloride, diethoxy zirconium dichloride, and diethoxy hafnium dichloride;

(d) trialkoxy transition metal monohalide is selected from a group comprising of triethoxy titanium chloride, triethoxy vanadium chloride, triethoxy zirconium chloride, and triethoxy hafnium chloride; and (e) tetraalkoxy transition metal is selected from a group comprising of tetrabutoxy titanium, tetraethoxy titanium, tetrabutoxy vanadium, tetraethoxy vanadium, tetrabutoxy zirconium, tetraethoxy zirconium, tetrabutoxy hafnium, and tetraethoxy hafnium.

A person skilled in the present art knows that the titanium to magnesium mole ratios used for catalyst synthesis are about 20 to 80 moles. In an embodiment, the titanium compound is added in amounts ranging from about at least 1 to 20 moles, with respect to one mole of magnesium. In one of the preferred embodiment, the titanium compound is added in amounts ranging from about at least 3 to 15 moles, with respect to one mole of magnesium. However usage of higher titanium compound is neither advantageous nor detrimental to catalyst synthesis process.

The contact temperature of the transition metal compound with solid component B is between about −50° C. and about 150° C. In one of the preferred embodiment the contact temperature of the transition metal compound with solid component B is between about −30° C. and about 120° C.

In an embodiment, the contact with transition metal compound can be either neat or in solvent which can be chlorinated or non chlorinated aromatic or aliphatic in nature examples not limiting to benzene, decane, kerosene, ethyl benzene, chlorobenzene, dichlorobenzene, toluene, o-chlorotoluene, xylene, dichloromethane, chloroform, cyclohexane and the like, comprising from 40 to 60 volume percent. In another embodiment, this treatment is either one shot or dropwise or controlled.

In one of the embodiments, this reaction system is gradually heated to the temperature effective to carry out the reaction at about −50° C. and about 150° C. In one of the preferred embodiments, this reaction system is gradually heated to the temperature effective to carry out the reaction at about −30° C. and about 120° C. The heating is instigated at a rate of 0.1 to 10.0° C./minute. Preferably the heating is instigated at a rate of 1 to 5.0° C./minute. The resultant is the solid component in the solvent comprising of magnesium, transition metal and halogen components.

A person skilled in the present art knows that the contact of the magnesium with transition metal compound is generally twice or more. In an embodiment, the contact of the magnesium with transition metal compound in presence of the solvent is single. However multiple contact with transition metal compound is neither advantageous nor detrimental to catalyst synthesis process.

The resulting solid component comprising of magnesium, titanium, halogen, and the internal electron donor can be separated from the reaction mixture either by filtration or decantation and finally washed with inert solvent to remove unreacted titanium component and other side products. Usually, the resultant solid material is washed one or more times with inert solvent which is typically a hydrocarbon including, not limiting to aliphatic hydrocarbon like isopentane, isooctane, hexane, pentane or isohexane. In an embodiment, the resulting solid mixture is washed one or more times with inert hydrocarbon based solvent preferably, hexane at temperature from about 20° C. to about 80° C. Preferably the resulting solid mixture is washed one or more times with inert hydrocarbon based solvent at temperature from about 25° C. to about 70° C. The solid catalyst can be separated and dried or slurried in a hydrocarbon specifically heavy hydrocarbon such as mineral oil for further storage or use.

In an embodiment, the catalyst composition includes from about 2.0 wt % to 20 wt % of internal electron donor, titanium is from about 1.0 wt % to 10.0 wt % and magnesium is from about 10 wt % to 25 wt %.

It is found by the inventors that the contact of acyl halide with the reaction mixture essentially results in the formation of catalyst having better activity and improved hexane soluble and better polymer properties. The addition of acyl halide during catalyst synthesis removes the possibility of any unreacted Grignard reagent which is detrimental to catalyst. This is tabulated in below Table 2.

TABLE 2

| Cat | Mg/RX | ID | Solvent/Acyl Halide | Ti wt % | Al/Ti mol ratio | Productivity (gPE/g cat) | Hexane soluble wt (%) | MFI @5 g/10 min | BD (tapped) |
|---|---|---|---|---|---|---|---|---|---|
| PEC#111 | 1/7 | DIBP | Toluene/benzoyl chloride | 2.8 | 80 | 3.4 | 0.07 | 0.73 | 0.40 |
| PEC#112 | 1/7 | DIBP | Toluene/no benzoyl chloride | 2.6 | 80 | 2.0 | 0.23 | 1.2 | 0.37 |

The present invention provides the catalyst system for polymerization of olefins. In the embodiment, the method of polymerization process is provided where the catalyst system is contacted with olefin under polymerization conditions. The catalyst system includes catalyst, organoaluminum compounds and/or external electron donors. The catalyst includes combination of magnesium moiety, titanium moiety and an internal donor.

Further, the present invention provides a method of polymerizing and/or copolymerizing olefins where the catalyst system is contacted with olefin under polymerization conditions. The catalyst system includes catalyst, cocatalyst and/or external electron donors. The co-catalyst may include hydrides, organoaluminum, lithium, zinc, tin, cadmium, beryllium, magnesium, and combinations thereof. In an embodiment, the preferred co-catalyst is organoaluminum compounds.

The olefins according to the present invention includes from C2-C20. The ratio of titanium (from catalyst): aluminum (from organoaluminum compound): external donor can be from 1: 5-1000:0-250 Preferably the ratio of titanium (from catalyst): aluminum (from organoaluminum compound): external donor in the range from 1:25-500:25-100. The present invention provides the catalyst system. The catalyst system includes catalyst component, organoaluminum compounds and external electron donors. In an embodiment, the organoaluminum compounds include, not limiting to, alkylaluminums such as trialkylaluminum such as preferably triethylaluminum, triisopropylaluminum, triisobutylaluminum, tri-n-butylaluminum, tri-n-hexylaluminum, tri-n-octylaluminum; trialkenylaluminums such as triisoprenyl aluminum; dialkylaluminum halides such as diethylaluminum chloride, dibutylaluminum chloride, diisobutylaluminum chloride and diethyl aluminum bromide; alkylaluminum sesquihalides such as ethylaluminum sesquichloride, butylaluminum sesquichloride and ethylaluminum sesquibromide; dialkylaluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; diethylaluminum ethoxide.

The mole ratio of aluminum to titanium is from about 5:1 to about 1000:1 or from about 10:1 to about 700:1, or from about 25:1 to about 500:1.

The external electron donors are organosilicon compounds, diethers and alkoxy benzoates. The external electron donor for olefin polymerization when added to the catalytic system as a part of co-catalyst retains the stereospecificity of the active sites, convert non-stereospecific sites to stereospecific sites, poisons the non-stereospecific sites and also controls the molecular weight distributions while retaining high performance with respect to catalytic activity. The external electron donors which are generally organosilicon compounds includes but are not limited to trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane, cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfiuorenyldimethoxysilane; monoalkoxysilanes such as tricyclopentylmethoxysilane, tricyclopentenylmethoxysilane, tricyclopentadienylmethoxysilane, tricyclopentylethoxysilane, cyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane, diindenylcyclopentylmethoxysilane and ethylenebis-cyclopentyldimethoxysilane; aminosilanes such as aminopropyltriethoxysilane, n-(3-triethoxysilylpropyl)amine, bis [(3-triethoxysilylppropyl]amine, aminopropyltrimethoxysilane, aminopropylmethyldiethoxysilane, hexanediaminopropyltrimethoxysilane.

In an embodiment, the external electron donor, other than organosilicon compounds include, but not limited to amine, diether, esters, carboxylate, ketone, amide, phosphine, carbamate, phosphate, sulfonate, sulfone and/or sulphoxide. The external electron donor is used in such an amount to give a molar ratio of organoaluminum compound to the said external donor from about 0.1 to 500. Preferably the external electron donor is used in such an amount to give a molar ratio of organoaluminum compound to the said external donor from 1 to 300.

In the present invention, the polymerization of olefins is carried out in the presence of the catalyst system described above. The catalyst system is contacted with olefin under polymerization conditions to produce desired polymer products. The polymerization process can be carried out such as by slurry polymerization using an inert hydrocarbon solvent as a diluent, or bulk polymerization using the liquid monomer as a reaction medium and in gas-phase operating in one or more fluidized or mechanically agitated bed reactors. In an embodiment, polymerization is carried out as such. In another embodiment, the copolymerization is carried out using at least two polymerization zones.

The catalyst of the invention can be used in the polymerization of the above-defined olefin $CH_2$=CHR, the examples of said olefin include ethylene, propylene, 1-butene, 4-methyl-1-pentene, 1-hexene, and 1-octene.

In particular, said catalyst can be used to produce, the following products such as high-density polyethylene (HDPE, having a density higher than 0.940 g/cm$^3$), which includes ethylene homopolymer and copolymer of ethylene and α-olefins having 3 to 12 carbon atoms; linear low-density polyethylene (LLDPE, having a density lower than 0.940 g/cm$^3$), and very low density and ultra low density polyethylene (VLDPE and ULDPE, having a density lower than 0.920 g/cm$^3$, and as low as 0.880 g/cm$^3$), consisting of the copolymer of ethylene and one or more α-olefins having 3 to 12 carbon atoms, wherein the molar content of the unit derived from ethylene is higher than 80%; elastomeric copolymer of ethylene and propylene, and elastomeric terpolymers of ethylene, propylene and butene-1 as well as diolefins at a small ratio, wherein the weight content of the unit derived from ethylene is between about 30% and 70%; isotactic polypropylene and crystalline copolymer of propylene and ethylene and/or other α-olefins, wherein the content of the unit derived from propylene is higher than 85% by weight (random copolymer); impact propylene polymer, which are produced by sequential polymerization of propylene and the mixture of propylene and ethylene, with the content of ethylene being up to 40% by weight; copolymer of propylene and 1-butene, containing a great amount, such as from 10 to 40 percent by weight, of unit derived from 1-butene. It is especially significant that the propylene polymers produced by using the catalysts of the invention have high isotactic index.

The polymerization is carried out at a temperature from 0 to 250° C. Preferably the polymerization is carried out at a temperature from 20 to 200° C. When the polymerization is carried out in gas phase, operation pressure is usually in the range of from 5 to 100 bar. In one of the preferred embodiment when the polymerization is carried out in gas phase, operation pressure is in the range of from 10 to 50 bar. The operation pressure in slurry polymerization is usually in the range of from 1 to 150 bar. In one of the preferred embodiment, operation pressure is usually in the range of from 2 to 50 bar. The operation pressure in solution polymerization is usually in the range of from 1 to 10 bar. In one of the preferred embodiment, the operation pressure in solution polymerization is in the range of from 2 to 7 bar. Hydrogen can be used to control the molecular weight of polymers.

In the present invention, the polymerization of olefins is carried out in the presence of the catalyst system described in the invention. The described catalyst can be directly added to the reactor for polymerization or can be prepolymerized i.e. catalyst is subjected to a polymerization at lower conversion extent before being added to polymerization reactor. Prepolymerization can be performed with olefins preferably ethylene and/or propylene where the conversion is controlled in the range from 0.2 to 500 gram polymer per gram catalyst.

In the present invention, the polymerization of olefins in presence of the described catalyst system leads to the formation of polyolefins having xylene solubility (XS) ranging from about 0.2% to about 15%. In another embodiment, polyolefins have xylene solubility (XS) from about 1% to about 8%. Here XS refers to the weight percent of polymer that get dissolves into hot xylene generally for measuring the tacticity index such as highly isotactic polymer will have low XS % value i.e. higher crystallinity, whereas low isotactic polymer will have high XS % value.

In another embodiment, polyolefins have hexane solubility from about 0.1% to about 10%. Here hexane solubility refers to the weight percent of polymer that get dissolve into hexane. Normally, low weight polymer gets dissolved in hexane.

The present invention provides the catalyst system. The catalysts system when polymerizes olefins provides polyolefins having melt flow indexes (MFI) of about 0.1 to about 100 which is measured according to ASTM standard D1238. In an embodiment, polyolefins having MFI from about 0.1 to about 30 are produced.

Having described the basic aspects of the present invention, the following non-limiting examples illustrate specific embodiment thereof.

1. Catalyst Synthesis Procedure

In a three neck jacketed reactor having 100 ml dry heptane, Mg (powder), organohalide and internal donor was added at 30° C. This reaction mixture was heated to 90° C. for 2 h. The mixture was kept settling and after decantation, washed with 80 ml toluene. After settling and decantation, 100 ml toluene was added followed by 5 ml of acyl halide and heated at 90° C. for 0.5 h. After settling and decantation, TiCl$_4$ along with toluene (80 ml) added and heated to 110° C. for 2 h. The product obtained after settling and decantation was washed with toluene followed by washings with hexane at 70° C. and dried at 70° C. under flow of nitrogen gas.

The solid catalysts composition synthesized by the above procedure has been tabulated in Table 3.

TABLE 3

| Cat. No | Mg | RX (organohalide) | Mg/RX Mol ratio | ID | Mg/ID | Solvent/Acyl Halide | Ti wt % | Mg wt % |
|---|---|---|---|---|---|---|---|---|
| ZN#75 | Granules | BuCl | 1/7 | DIBP | 12.2 | Toluene/nil | 3.6 | 19.5 |
| ZN#122 | Granules | BuCl | 1/7 | DIBP | 8.2 | Toluene/benzoyl chloride | 2.6 | 19.5 |
| PEC#1 | Granules | BuCl | 1/7 | EB | 4.9 | Toluene/benzoyl chloride | 2.6 | 22.4 |
| PEC#6 | Granules | BuCl | 1/7 | DIBP/TEOS | 12.0 | Toluene/benzoyl chloride | 2.7 | 20.3 |
| PEC#111 | Granules | BuCl | 1/7 | DIBP | 12.2 | Toluene/benzoyl chloride | 2.8 | 22.2 |
| PEC#112 | Granules | BuCl | 1/7 | DIBP | 12.2 | Toluene/nil | 2.6 | 22.6 |
| PEC#151 | Granules | BuCl | 1/7 | DIBP | 12.2 | Toluene/benzoyl | 2.1 | 20.4 |

TABLE 3-continued

| Cat. No | Mg | RX (organohalide) | Mg/RX Mol ratio | ID | Mg/ID | Solvent/Acyl Halide | Ti wt % | Mg wt % |
|---|---|---|---|---|---|---|---|---|
| | | | | | | chloride | | |
| PEC#152 | Granules | BuCl | 1/7 | DIBP | 12.2 | Toluene/nil | 2.4 | 20.5 |
| PEC#153 | Granules | BuCl | 1/7 | DIBP | 12.2 | Toluene/benzoyl chloride | 2.0 | 20.9 |
| PEC#193 | Granules | BuCl | 1/7 | Ethyl benzoate | 12.2 | Toluene/benzoyl chloride | 1.3 | 20.2 |
| PEC#194 | Granules | BuCl | 1/7 | Diethyl malonate | 12.2 | Toluene/benzoyl chloride | 1.6 | 20.7 |
| PEC#195 | Granules | BuCl | 1/7 | DIBP | 12.2 | Toluene/4-tert-butyl benzoyl chloride | 1.7 | 20.1 |
| PEC#200 | Granules | BuCl | 1/7 | Diethyl succinate | 12.2 | Toluene/benzoyl chloride | 1.9 | 21.5 |
| PEC#202 | Granules | BuCl/Benzyl Chloride (50:50 v/v) | 1/7 | DIBP | 12.2 | Toluene/benzoyl chloride | 2.2 | 20.1 |

2. Polymerization of Ethylene

Ethylene polymerization was carried out in 500 ml Buchi reactor which was previously conditioned under nitrogen. The reactor was charged with 250 ml of dry hexane containing solution of 10 wt % triethylaluminum and calculated amount of solid catalyst. The reactor was pressurized with hydrogen to 14.2 psi then charged with 71 psi of ethylene under stirring at 750 rpm. The reactor was heated to and then held at 70° C. for 2 hour. At the end, the reactor was vented and the polymer was recovered at ambient conditions.

Catalyst synthesized using chlorinated organic compound i.e., acyl halide performance and polymer properties have been tabulated in Table 4.

TABLE 4

| Cat | Ti wt % | Al/Ti mole ratio | Cat mg | C2 (bar) | H2 (bar) | Productivity (kg PE/g cat) | Hexane soluble wt (%) | MFI @5 kg/10 min | BD (tapped) |
|---|---|---|---|---|---|---|---|---|---|
| ZN#75 | 3.6 | 100 | 33.9 | 4 | 1 | 3.6 | 0.22 | 1.3 | 0.35 |
| ZN#122 | 2.6 | 250 | 19.9 | 4 | 1 | 4.5 | 0.05 | 0.85 | 0.40 |
| PEC#1 | 2.6 | 250 | 19.9 | 4 | 1 | 4.2 | 0.07 | 0.1 | 0.38 |
| | | | 19.6 | 3 | 2 | 2.5 | 0.05 | 2.0 | 0.36 |
| | | | 19.8 | 2 | 3 | 1.2 | 0.08 | 21.3 | 0.30 |
| | | | 19.4 | 1 | 4 | 0.6 | 0.10 | Not determine | 0.30 |
| PEC#6 | 2.7 | 250 | 20.6 | 4 | 1 | 2.1 | 0.10 | 2.3 | 0.35 |
| PEC#111 | 2.8 | 80 | 25.0 | 4 | 1 | 3.4 | 0.07 | 0.73 | 0.40 |
| PEC#112 | 2.6 | 80 | 25.1 | 4 | 1 | 2.0 | 0.23 | 1.2 | 0.37 |
| PEC#151 | 2.1 | 80 | 30.3 | 4 | 1 | 2.0 | 0.17 | 2.8 | 0.35 |
| | | | 30.2 | 3 | 2 | 1.0 | 0.69 | 10.1 | 0.35 |
| PEC#152 | 2.4 | 80 | 30.1 | 4 | 1 | 2.1 | 0.25 | 1.9 | 0.39 |
| | | | 30.2 | 4 | 1 | 2.1 | 0.29 | 2.1 | 0.38 |
| | | | 30.3 | 3 | 2 | 1.2 | 0.65 | 14 | 0.37 |
| | | | 30.4 | 2 | 3 | 0.5 | 2.0 | Not determine | Sample too less for analysis |
| PEC#153 | 2.0 | 80 | 30.5 | 4 | 1 | 1.8 | 0.12 | 2.0 | 0.39 |
| | | | 30.5 | 3 | 2 | 1.1 | 0.84 | 10.4 | 0.37 |
| | | | 30.5 | 2 | 3 | 0.6 | 1.1 | 16 | Sample too less for analysis |
| PEC#193 | 1.3 | 200 | 30.3 | 4 | 1 | 1.4 | 0.24 | 0.6 | 0.34 |
| PEC#194 | 1.6 | 80 | 50.1 | 4 | 1 | 0.5 | 0.52 | 0.4 | 0.36 |
| PEC#195 | 1.7 | 80 | 50.3 | 4 | 1 | 0.5 | 0.3 | 0.5 | 0.37 |
| PEC#200 | 1.9 | 200 | 50.6 | 4 | 1 | 1.1 | 0.31 | 0.4 | 0.35 |
| PEC#202 | 2.2 | 200 | 50.4 | 4 | 1 | 1.0 | 0.43 | 0.6 | 0.35 |

The invention claimed is:

1. A process of preparing a catalyst for olefin polymerization comprising:

(i) treating a magnesium metal with an organohalide along with an internal donor to obtain a reaction mixture having solid component (A);

(ii) treating the reaction mixture having solid component (A) with an acyl halide to obtain a reaction mixture having solid component (B); and (iii) treating the reaction mixture having solid component (B) of step (ii) with a transition metal compound to obtain the catalyst.

2. The process as claimed in claim 1, wherein the organohalide is selected from the group consisting of alkyl halides, benzylic halides, halogenated alkyl benzene and mixture thereof;

wherein:

(i) alkyl halide is selected from the group consisting of methyl chloride, ethyl chloride, propyl chloride, isopropyl chloride, 1,1-dichloropropane, 1,2-dichloropropane, 1,3-dichloropropane, 2,3-dichloropropane, butyl chloride, 1,4-dichlorobutane, tert-butylchloride, amylchloride, tert-amylchloride, 2-chloropentane, 3-chloropentane, 1,5-dichloropentane, 1-chloro-8-iodoctane, 1-chloro-6-cyanohexane, cyclopentylchloride, cyclohexylchloride, chlorinated dodecane, chlorinated tetradecane, chlorinated eicosane, chlorinated pentacosane, chlorinated triacontane, iso-octyl chloride, 5-chloro-5-methyl decane, and 9-chloro-9-ethyl-6-methyl eiscosane;

(ii) benzylic halide is selected from the group consisting of benzyl chloride and α,α' dichloro xylene; and (iii) halogenated alkyl benzene comprises alkyl radical containing from about 10 to 15 carbon atoms, and the halogen is selected from the group consisting of chlorine, bromine, fluorine and iodine.

3. The process as claimed in claim 1, wherein the magnesium metal is reacted with the organohalide in a molar ratio of between 1:30 to 1:1.

4. The process as claimed in claim 1, wherein the internal electron donor is selected from the group consisting of phthalates, benzoates, diethers, succinates, malonates, carbonates/carboxylate, silyl esters, amide esters, ether esters, amide ethers, silyl ethers, silyl ether esters, 1,2-phenylene dioates and combinations thereof;
wherein:
(i) phthalates is selected from the group consisting of di-n-butyl phthalate, di-i-butyl phthalate, di-2-ethylhexyl phthalate, di-n-octyl phthalate, di-i octyl phthalate, di-n-nonyl phthalate;
(ii) benzoates is selected from the group consisting of methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate, methyl anisate, and ethyl anisate;
(iii) succinate is selected from the group consisting of diethyl succinate, di-propyl succinate, diisopropyl succinate, dibutyl succinate, and diisobutyl succinate;
(iv) malonates is selected from the group consisting of diethyl malonate, diethyl ethylmalonate, diethyl propyl malonate, diethyl isopropylmalonate, and diethyl butylmalonate;
(v) carbonates/carboxylate is selected from the group consisting of diethyl 1,2-cyclohexanedicarboxylate, di-2-ethylhexyl 1,2-cyclohexanedicarboxylate, di-2-isononyl 1,2-cyclohexanedicarboxylate, 1,2-phenylene diisopentanoate, 4-t-butyl-1,2-phenylene diisopentanoate, 4-t-butyl-1,2-phenylene bis(2-ethylhexanoate), and diisobutyl 2,2'-((4-tert -butyl)-1,2-pheylene)bi s(oxy) diacetate; and
(vi) diether/ether is selected from the group consisting of 9,9-bis(methoxymethyl)fluorene, 2-isopropyl-2-sopentyl-1,3-dimethoxypropane, 2,2-diisobutyl-1,3-dimethoxypropane, 2,2-diisopentyl-1,3-dimethoxypropane, 2-isopropyl-2-cyclohexyl-1 ,3-dimethoxypropane, and tetrahydrofuran or mixture thereof.

5. The process as claimed in claim 1, wherein the internal electron donor is used in an amount of from 0.01 to 1 moles with respect to one mole of magnesium.

6. The process as claimed in claim 1, wherein the contact of magnesium metal, organohalide and internal donor is either neat or in a solvent.

7. The process as claimed in claim 6, wherein the solvent is selected from the group consisting of chlorinated aromatic hydrocarbon, non chlorinated aromatic hydrocarbon, chlorinated aliphatic hydrocarbon, non chlorinated aliphatic hydrocarbon and combination thereof.

8. The process as claimed in claim 6, wherein the solvent is comprising from 40 to 60 volume percent and is selected from the group consisting of benzene, decane, kerosene, ethyl benzene, chlorobenzene, dichlorobenzene, toluene, o-chlorotoluene, xylene, dichloromethane, chloroform, hexane, heptane, isooctane, cyclohexane and combination thereof.

9. The process as claimed in claim 6, wherein the contact of magnesium, organohalide and internal donor either neat or in the solvent is at temperature between about 0° C. and about 150° C. and the contact time is for about 0.5 to 12 h.

10. The process as claimed in claim 1, wherein the solid component (A) is separated from the reaction mixture either by filtration or decantation and finally washed with a solvent to remove unreacted components and other side products before reacting with the acyl halide.

11. The process as claimed in claim 1, wherein the solid component (A) is washed one or more times with a solvent selected from the group consisting of pentanes, hexanes, heptanes, octanes, decanes, toluene, chlorobenzene at a temperature from about 20° C. to about 120° C.

12. The process as claimed in claim 1, wherein the solid component (A) is used as such after washing or is isolated and treated further with solvent to form a reaction mixture, before reacting with acyl halide.

13. The process as claimed in claim 1, wherein the acyl halide is represented by RCOX where R is H, $C_i$-$C_{20}$ linear or branched alkyl group which optionally linked with cyclic rings, $C_6$-$C_{14}$ aryl groups, $C_3$-$C_{15}$ cycloalkyl groups, $C_i$-$C_{20}$ alkoxy group, optionally containing heteroatom and X is selected from halides.

14. The process as claimed in claim 1, wherein the acyl halide is selected from the group consisting of formyl chloride, acetyl chloride, benzoyl chloride, tert-butylbenzoyl chloride, 2-ethyl hexanoyl chloride, valeryl chloride, isovaleryl chloride, phthaloyl chloride, 2,3-naphthalenedicarboxylic dichloride, endo-5-norborene-2,3-dicarboxylic acid dichloride, maleic dichloride, citraconic acid dichloride and combination thereof.

15. The process as claimed in claim 1, wherein a molar ratio of magnesium to acyl halide is between 1:5 to 1:0.05.

16. The process as claimed in claim 1, wherein the acyl halide contact with the solid component (A) results in formation of solid component (B) and the contacting time is immediate to 2 h, and a contact temperature is between about 5° C. and about 150° C.

17. The process as claimed in claim 1, wherein the solid component (B) is separated from the reaction mixture either by filtration or decantation and finally washed with a solvent to remove unreacted components and other side products before reacting with the transition metal compound.

18. The process as claimed in claim 17, wherein the solid component (B) is washed one or more times with the solvent selected from the group consisting of pentanes, hexanes, heptanes, octanes, decanes, toluene, and chlorobenzene at a temperature from about 20° C. to about 120° C.

19. The process as claimed in claim 1, wherein the transition metal compound is transition metal halide selected from compounds represented by $M(OR')_pX_{4-p}$, where M is a transition metal and is selected from the group consisting of Ti, V, Zr, and Hf; X is a halogen atom; R' is a hydrocarbon group and p is an integer having value equal or less than 4.

20. The process as claimed in claim 1, wherein the transition metal compound is selected from the group consisting of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof; wherein:
(a) the transition metal tetrahalide is selected from the group consisting of titanium tetrachloride, titanium tetrabromide, titanium tetraiodide, vanadium tetrachloride, vanadium tetrabromide, vanadium tetraiodide, zirconium tetrachloride, zirconium tetrabromide, zirconium tetraiodide, hafnium tetrachloride, hafnium tetrabromide, and hafnium tetraiodide;
(b) alkoxy transition metal trihalide/aryloxy transition metal trihalide is selected from the group consisting of methoxytitanium trichloride, ethoxytitanium trichloride, butoxytitanium trichloride, phenoxytitanium trichloride methoxyvanadium trichloride, ethoxyvanadium trichloride, butoxyvanadium trichloride, phenoxyvanadium trichloride, methoxyzirconium trichloride, ethoxyzirconium trichloride, butoxyzirconium trichloride, phenoxyzirconium trichloride, methoxyhafnium trichloride, ethoxyhafnium trichloride, butoxyhafnium trichloride, and phenoxyhafnium trichloride;
(c) dialkoxy transition metal dihalide is selected from the group consisting of diethoxy titanium dichloride diethoxy vanadium dichloride, diethoxy zirconium dichloride, and diethoxy hafnium dichloride;
(d) trialkoxy transition metal monohalide is selected from the group consisting of triethoxy titanium chloride, triethoxy vanadium chloride, triethoxy zirconium chloride, and triethoxy hafnium chloride; and
(e) tetraalkoxy transition metal is selected from the group consisting of tetrabutoxy titanium, tetraethoxy titanium, tetrabutoxy vanadium, tetraethoxy vanadium, tetrabutoxy zirconium, tetraethoxy zirconium, tetrabutoxy hafnium, and tetraethoxy hafnium.

21. The process as claimed in claim 1, wherein contact temperature of the transition metal compound with the solid component (B) is between about -50° C. and about 150° C. and heating is instigated at a rate of 0.1 to 10.0° C./minute.

22. The process as claimed in claim 1, wherein the solid component (B) contacts with transition metal compound either neat or in a solvent.

23. The process as claimed in claim 22, wherein the solvent is selected from the group consisting of chlorinated aromatic hydrocarbon, non chlorinated aromatic hydrocarbon chlorinated aliphatic hydrocarbon, non chlorinated aliphatic hydrocarbon and combination thereof.

24. The process as claimed in claim 22, wherein the solvent is comprising from 40 to 60 volume percent and selected from the group consisting of benzene, decane, kerosene, ethyl benzene, chlorobenzene, dichlorobenzene, toluene, o-chlorotoluene, xylene, dichloromethane, chloroform, cyclohexane and combination thereof.

25. The process as claimed in claim 1, wherein the process is a single pot catalyst synthesis.

26. The process as claimed in claim 1, wherein the contact of the solid component (B) with transition metal compound is single.

27. A The process as claimed in claim 1, wherein the catalyst so obtained comprises from about 2.0 wt % to 20 wt % of internal electron donor, transition metal from about 1.0 wt % to 10.0 wt% and magnesium from about 10 wt% to 25 wt %.

28. A The process as claimed in claim 1, wherein said process further comprises contacting the catalyst as obtained with at least one cocatalyst, and at least one external electron donor to obtain a catalyst system.

29. The process as claimed in claim 28, wherein said process further comprises the step of contacting an olefin under polymerization conditions with the catalyst system.

* * * * *

UNITED STATES PATENT AND TRADEMARK OFFICE
CERTIFICATE OF CORRECTION

PATENT NO. : 9,896,523 B2
APPLICATION NO. : 15/185019
DATED : February 20, 2018
INVENTOR(S) : Singh et al.

Page 1 of 1

It is certified that error appears in the above-identified patent and that said Letters Patent is hereby corrected as shown below:

On the Title Page

Item (73), Assignee: Line 2, change "(Ease)" to --(East)--

Signed and Sealed this
Thirty-first Day of July, 2018

Andrei Iancu
*Director of the United States Patent and Trademark Office*